US010169994B2

(12) United States Patent
Astigarraga et al.

(10) Patent No.: US 10,169,994 B2
(45) Date of Patent: Jan. 1, 2019

(54) VEHICULAR COLLABORATION FOR VEHICULAR PARKING AREA AVAILABILITY DETECTION

(71) Applicant: INTERNATIONAL BUSINESS MACHINES CORPORATION, Armonk, NY (US)

(72) Inventors: Tara Astigarraga, Fairport, NY (US); Itzhack Goldberg, Hadera (IL); Richard Hutzler, Tucson, AZ (US); Neil Sondhi, Pilisborosjeno (HU); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/422,918

(22) Filed: Feb. 2, 2017

(65) Prior Publication Data
US 2018/0218604 A1  Aug. 2, 2018

(51) Int. Cl.
G08G 1/00 (2006.01)
G08G 1/14 (2006.01)
H04L 29/08 (2006.01)
G08G 1/0969 (2006.01)
G01C 21/34 (2006.01)

(52) U.S. Cl.
CPC ......... G08G 1/141 (2013.01); G01C 21/3492 (2013.01); G08G 1/0969 (2013.01); H04L 67/12 (2013.01)

(58) Field of Classification Search
None
See application file for complete search history.

(56) References Cited

U.S. PATENT DOCUMENTS

2013/0138518 A1*  5/2013  White ................. G06Q 20/204
                                                              705/16
2014/0104422 A1    4/2014  Choi et al.
2015/0130640 A1    5/2015  Ryu et al.
2016/0042643 A1    2/2016  Hohenacker
2016/0093214 A1    3/2016  Wu et al.
2016/0195404 A1*   7/2016  Prasad ................. G06T 11/206
                                                              345/440
2016/0358108 A1*  12/2016  Sadovsky .............. G06Q 10/02

FOREIGN PATENT DOCUMENTS

WO    WO 2013170882 A1 * 11/2013 ............. H04L 67/12
WO       2014072971 A1    5/2014
WO       2014084118 A1    5/2014
WO       2016041689 A1    3/2016

OTHER PUBLICATIONS

Sevillano et al., "Towards Smart Traffic Management Systems: Vacant On-Street Parking Spot Detection Based on Video Analysis," Information Fusion (FUSION), 17th Conference on IEEE, 2014 (8 pages).

* cited by examiner

Primary Examiner — Julie Lieu
(74) Attorney, Agent, or Firm — Griffiths & Seaton PLLC

(57) ABSTRACT

Embodiments for using vehicular collaboration for vehicular parking area availability detection by a processor. An indication, having a degree of certainty according to a plurality of factors for obtaining a vehicular parking area, may be provided upon receiving data capturing one or more vehicular parking areas from one or more devices of at least one of a plurality of collaborative vehicles in substantially close proximity to the one or more vehicular parking areas.

18 Claims, 7 Drawing Sheets

US 10,169,994 B2

VEHICULAR COLLABORATION FOR VEHICULAR PARKING AREA AVAILABILITY DETECTION

BACKGROUND OF THE INVENTION

Field of the Invention

The present invention relates in general to computing systems, and more particularly to, various embodiments for using vehicular collaboration for vehicular parking area availability detection by a processor.

Description of the Related Art

Vehicles of every kind, size, and energy consumption are prevalent in every aspect of today's society, as people are more mobile today than likely at any time in recorded history. Attendant with the proliferation of vehicles have been certain limitations associated with navigating a vehicle through urban settings and locating an available parking area at or near a desired destination. For example, drivers of automotive vehicles in urban settings frequently waste a lot of time driving around a parking lot in search of an open or optimal parking lot location also referred to as a parking spot or parking area. Searching for an open or optimal parking area location only compounds the navigation task of the vehicle.

SUMMARY OF THE INVENTION

Various embodiments for using vehicular collaboration for vehicular parking area availability detection by a processor, are provided. In one embodiment, by way of example only, a method for using a vehicular collaboration system for vehicular blind spot detection by a processor is provided. An indication, having a degree of certainty according to a plurality of factors for obtaining a vehicular parking area, may be provided upon receiving data capturing one or more vehicular parking areas from one or more devices of at least one of a plurality of collaborative vehicles in substantially close proximity to the one or more vehicular parking areas.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
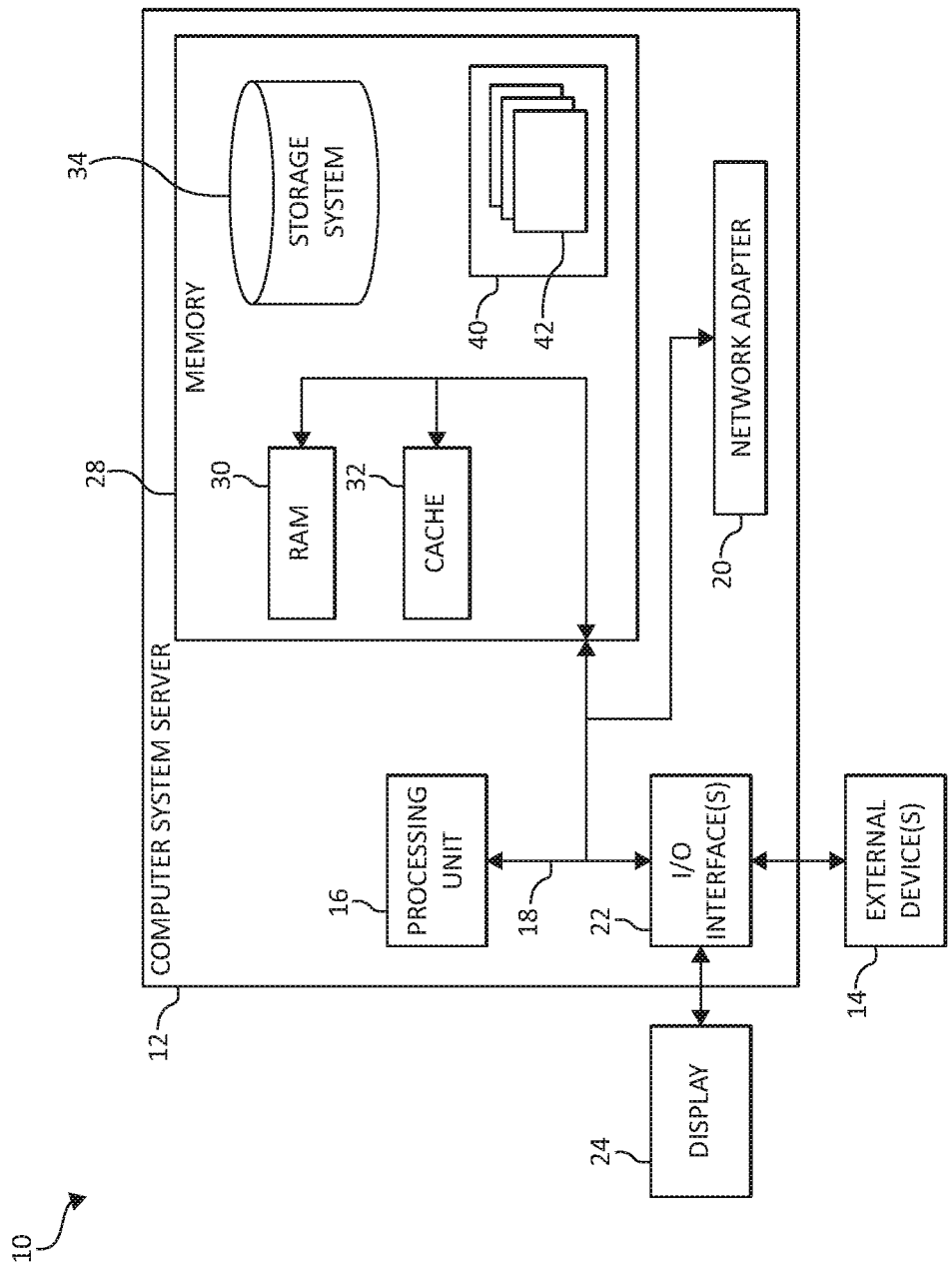
FIG. 1 is a block diagram depicting an exemplary computing node according to an embodiment of the present invention.

A common problem to operators of motor vehicles (e.g., "drivers") is the difficulty in identifying and locating a parking area (e.g., a parking spot or "parking stall") near a location of a target destination. To alleviate locating a parking spot, some parking lot facilities have provided an indication in a parking garage or parking lot that there are parking spaces available. However, the designated parking spot locations are typically not provided to the vehicle driver. Furthermore, when no indication of available parking locations/spots are identified by any type of signage, drivers often find themselves wasting time driving around a parking lot trying to find an available parking spot. Even worse, some drivers park in travel lanes or restricted areas of a parking lot area such as, for example, when anticipating a vehicle to exit a parking stall only to later find the driver's vehicle is either too large for the desired parking spot or the vehicle never exits the parking spot.

Thus, the mechanisms of the present invention use a vehicular collaboration system for using vehicular collaboration for vehicular parking area availability detection. An indication, having a degree of certainty according to a plurality of factors for obtaining a vehicular parking area, may be provided upon receiving data capturing one or more vehicular parking areas from one or more devices of at least one of a plurality of collaborative vehicles in substantially close proximity to the one or more vehicular parking areas.

In one aspect, the present invention provides a solution utilizing a video input device on one or more vehicles coupled with image recognition capabilities to identify and locate available or "open" parking spaces (e.g., no vehicle parked in that particular parking space). For example, the present invention may identify different parking space images unique to a selected geographical area (e.g., an urban area, province and/or country). The various shapes and sizes of a parking area may be determined and distinguished so as to match a vehicle being driven within the parking area (e.g., a small car or motorcycle is matched with an available parking stall having the shape and size compatible with the small car or motorcycle).

As an additional aspect, the present invention may identify various colors painted or drawn in a parking location and/or on curbs for identifying various types of parking locations or restricted areas (e.g., a handicap parking spot, red zones ("emergency") for no parking, deliveries only, etc.). One or more signs used to identify open parking areas and/or 'permit only' parking areas may be identified.

Using the vehicular collaboration system/network for vehicular parking area availability detection, collaborating vehicles in the vehicular collaboration system/network may identify parking spots in an area of interest for the driver of a vehicle in the vehicular collaboration system/network that indicates an intent to obtain a parking spot. Also, one or more of the collaborating vehicles driving a similar route as a vehicle expressing interest for parking can be used to confirm the space availability of an available parking spot so that available parking spots may be provided to an availability map while recently reoccupied spots are deleted from the parking availability map.

In one aspect, the vehicular collaboration system/network may include crowd source data, where one or more applications rely on traffic sources such as public sector and private entity sources, which can provide updated or real-time traffic data. For example, the vehicular collaboration system/network may include a mobile application, such as "Waze®" (available from Waze Ltd.), that may automatically collect traffic data and road condition information from users as they drive. The vehicular collaboration system/network may rely on crowd sourced data to present updated traffic information to users of the application. The vehicular collaboration system/network may consider traditional traffic sources when presenting traffic information to its users. The vehicular collaboration system/network may utilize image recognition data via one or more collaborative vehicles, such as, for example, crowd sourced data via image recognition, which may include image data that may be monitored and updated in real-time (e.g., on a continual basis that monitors and identifies each state change).

In one aspect, one or more cameras and sensors may be placed or located at one or more locations of a vehicle (e.g., dashboard, front or rear bumpers, wheel-well, or other locations suitable for mounting or securing a camera) in order to determine one or more available and open parking areas. That is, one or more available and open parking areas may be detected in front of, behind, and/or to one or more sides of the vehicle using the vehicular collaboration system.

In an additional aspect, the vehicular collaboration system may be employed as a "car-net" capturing one or more angles, views, and/or dimensions of the vehicle and one or more geographical areas (e.g., a parking lot with one or more parking stalls/spots) by using one or more cameras and/or sensor based devices of nearby, neighboring cars, which alert the vehicle and/or vehicular collaboration network that one or more available and open parking areas are detected. The vehicular collaboration system may include using collaborative images, video, sounds, or other sensor-based device data via a social "car-net" through sharing of information. The collaborative data may be combined to form a 360-degree view of the vehicle that may extend to a selected location (such as a parking lot) capable of being displayed such as, for example, in a display system of the vehicle. A navigational route may be determined and presented in order for the vehicle to successfully and safely navigate to one or more identified parking areas.

The vehicular collaboration system may be employed without changes to any road infrastructures and without having to install expensive parking sensors in any target destination (e.g., a parking lot). Once an operator of a vehicle is made aware of a parking vacancy through an on-screen reporting display of one or more vehicles in the vehicular collaboration system, the operators of one or more vehicles may advise a centralized server or "HUB" of the vehicular collaboration system via an interactive GUI or other communication means (e.g., a voice activated detection system of a vehicle in communication with the vehicular collaboration system) of their intent to secure or park in one of the available parking spots.

More specifically, the vehicular collaboration system may be employed using one or more sensors associated with one or more parking spaces. For example, one or more sensors or camera devices embedded, installed, and/or directed to one or more parking spaces may be used in the vehicular collaboration system. As a specific example, one or more sensors installed in a parking space may also be employed in the vehicular collaboration system. Also, one or more camera systems (e.g., installed on buildings, signs, posts, and/or other parking stalls), which may capture a field of view (FOV) of one or more parking spots may also be employed in the vehicular collaboration system.

For example, the HUB may determine or calculate one or more distances and traffic conditions facing each of the parking seekers. Each driver may then receive a rank based on their own locations compared to the other drivers who might be looking for the same parking spot. In this way, the drivers who happen to be at the bottom of the ranking list would have real time info to decide if they'd even attempt to get to that parking spot. This ranking system may assist in reducing traffic congestion since not all active seekers would be converging into an already congested area.

The vehicular collaboration system may be in a virtual computing environment that may be in an Internet of Things (IoT) network. It should be noted that the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many IoT devices are devices that are independently operable, but they may also be paired with a control system or alternatively a distributed control system such as one running over a cloud computing environment. Thus, the vehicular collaboration system may be employed and used, as described herein, in an IoT device or "smart device" (e.g., a navigation system, entertainment system, computer, and/or smart phone or tablet, and the like), which may be located internal or external to a vehicle associated with the vehicular collaboration system.

It should be noted that as used herein, "vehicle" may include one or more variety types of modes of transportation. For example, vehicle may include automobiles (e.g., car, sport utility vehicle "SUV", trucks, etc.), off-road vehicles (e.g., all-terrain vehicles "ATV") bicycles, motorcycles, trains, subways, ships, boat, aircrafts, watercrafts, sail crafts, hovercrafts, golf carts, and/or other types of transportation or movable objects. In an additional aspect, vehicle may include one or more types of transportation or movable objects that require a license and/or registration (e.g., a driver's license issued by a governmental or regulatory agency) in order to operate and move about a roadway, highway, railways, and/or other means for operating the one or more types of transportation or movable objects.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter may communicate with a hub server or a cloud via wireless, optical fibre, or copper fibre. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
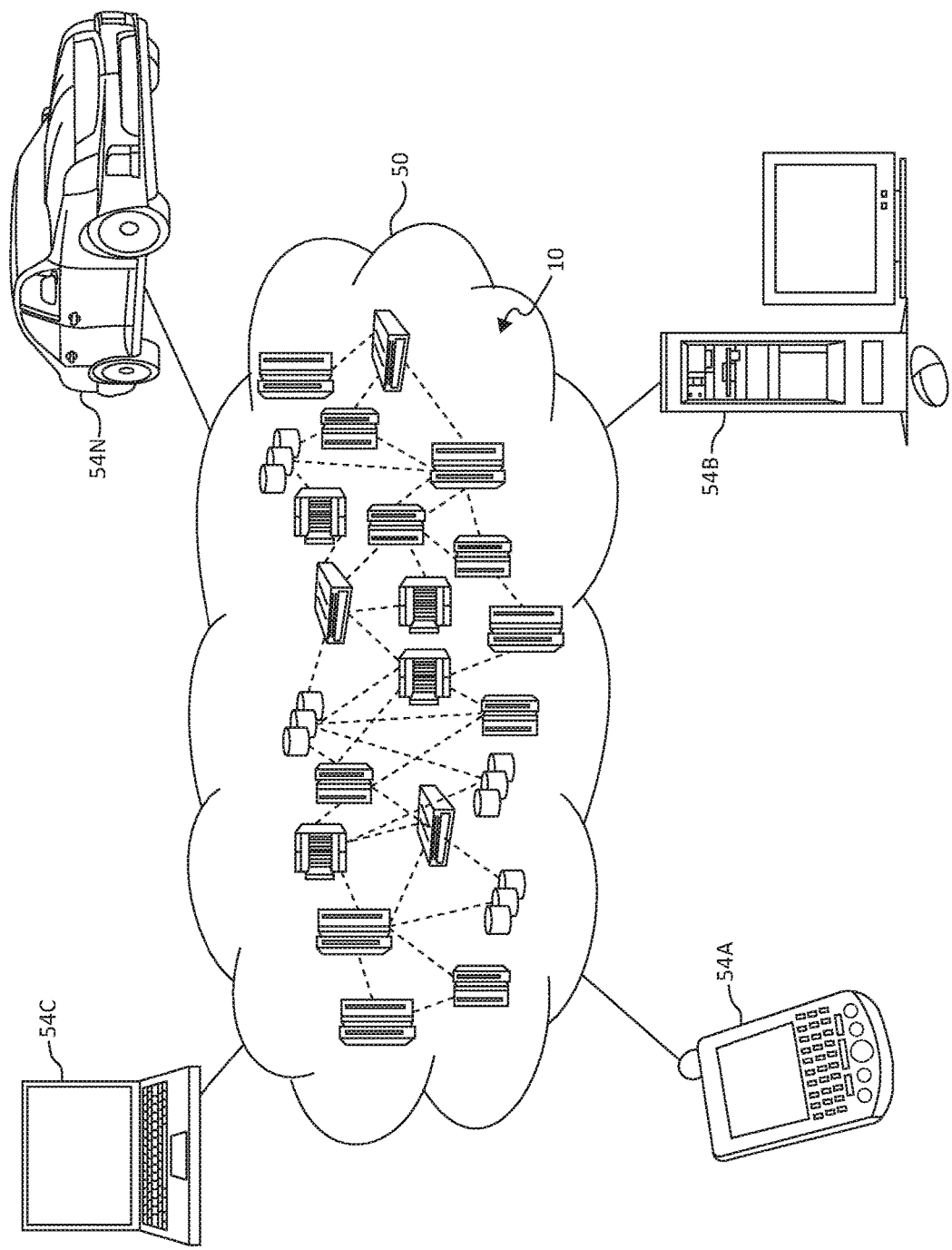
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser provided by a service provider).

Figure 3:
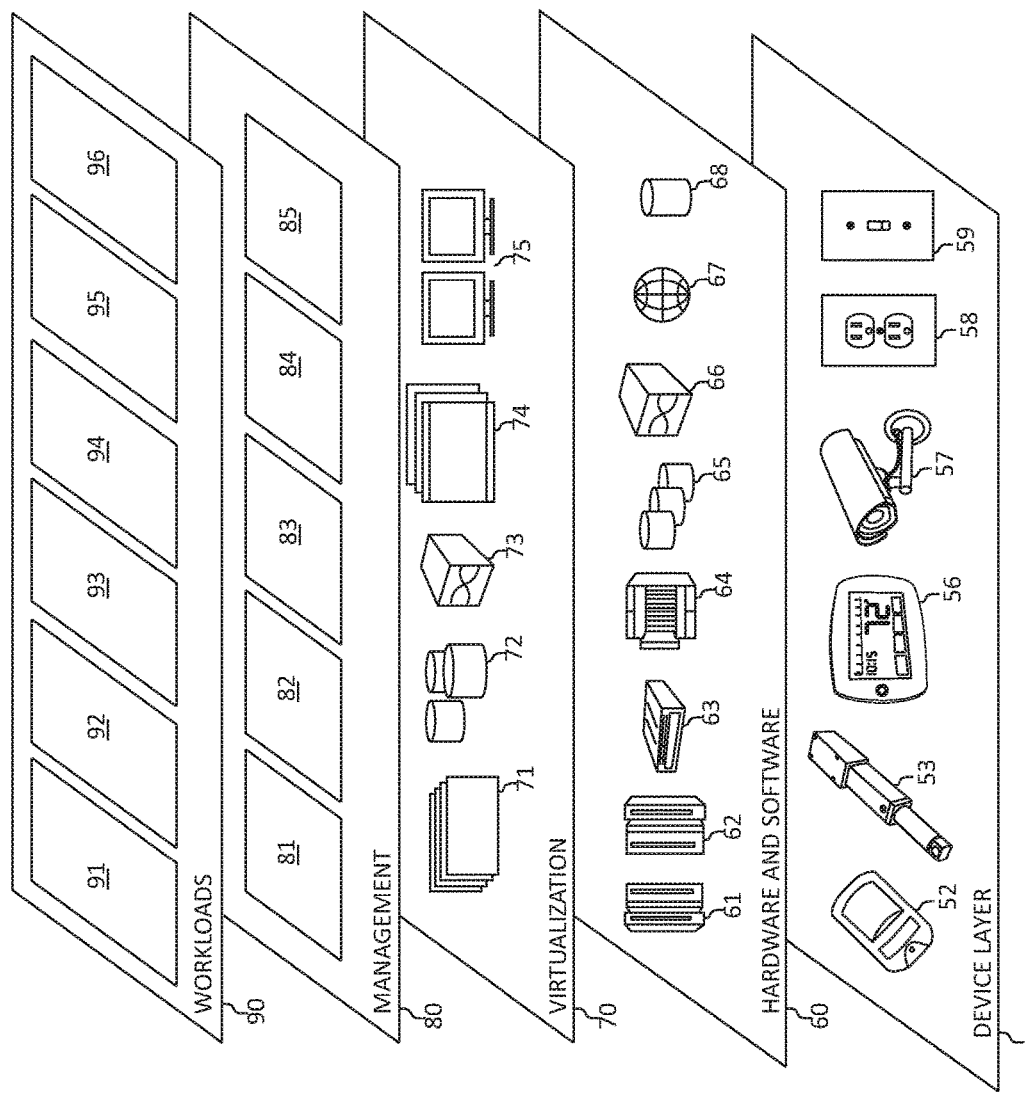
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "Internet of Things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture, such as PowerPC, based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various vehicular collaboration and vehicular parking area availability detection workloads and functions 96. In addition, vehicular collaboration and vehicular parking area availability detection workloads and functions 96 may include such operations as data analysis (including data collection and processing from various environmental sensors), collaborative data analysis, and predictive data analytics functions. One of ordinary skill in the art will appreciate that the vehicular collaboration and vehicular parking area availability detection workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described herein, the present invention provides for a vehicular collaboration system or "Networked Communities" that aids in the finding of vacant parking spots (unoccupied parking areas) and also identifying and determining when an unoccupied parking spot is being re-occupied. For example, upon starting the vehicular collaboration system application on either a mobile device, or via on-board navigation, communication may be established with a centralized server or "HUB", which may be in a cloud computing environment (e.g., cloud computing environment 50 of FIG. 2). Vehicle Collaboration System 510 (see FIG. 5) may be advised on how many video input devices are operable on a collaborative vehicle and the vehicle's location. If a collaborative vehicle in the vehicular collaboration system utilizes just one input device, then only its relative perspective to recognize open parking markers may be used and may be dependent on the direction the vehicle is traveling. In this way, the vehicular collaboration system can identify which of the collaborative vehicle(s) can confirm the availability of a previously reported parking space and monitor reports from relevant cars without actively requesting/receiving information from the vehicular collaboration system community. This helps to ensure a highest level of certainty about available parking stalls 506 (see available parking stall 506 of FIG. 5). It should be noted that in one aspect the vehicular collaboration system may provide connectivity between cloud computing environment 50 and items 54A, 54B, 54C, and 54N.

In one aspect, using two [or more] input devices, mounted on each of the collaborative vehicles, enables for constant (e.g., real-time) monitoring of a geographical area (e.g., a curb area) passed by that vehicle. This allows a multiple-perspective input to identify open parking (e.g., looking for curb area makings or other specific open parking indicators), as the vehicle travels.

For example, if a vehicle is already parked, then these curb area makings may be obscured and that space would be identified as "not available" or "occupied". If these curb area makings are visible to one or more other collaborative vehicles, then that respective space may be identified to the service provided as open and the vehicular collaboration system community is alerted. These input devices may communicate through one or more various types of wireless communication standards, such as for example, a third generation partnership project (3GPP) radio access network (RAN) long term evolution (LTE) system, Wi-Fi/Worldwide Interoperability for Microwave Access (WiMAX) networks, High Speed Packet Access (HSPA), Bluetooth, Wi-Fi, a combination thereof, and/or other wireless communication protocols, such as with either an IoT device (e.g., a smart phone or "user equipment") or the vehicle's on-board navigational systems. This info may then update the vehicular collaboration system to report one or more collaborative vehicles' location and "piggyback" that information of the location of the open and available parking stall 506.

Other collaborative vehicles within the vehicular collaboration system network, traveling along one or more similar routes may confirm on an ongoing basis, the availability of the parking slots, using the collaborative data received from each one of the collaborative vehicles. This keeps the data relevant for the subscribing vehicular collaboration system community.

In an additional aspect, based on publicly provided information, one or more of a plurality of factors (e.g., parking thresholds) may be set by a user of the vehicular collaboration system to limit parking space candidates. For example, the plurality of factors or parking thresholds may include, but are not limited to, restricting parking to certain times of travel by the user, restrictions based on how long parking is allowed (e.g., a maximum of 1 hour as compared to a need for 6 hours of parking), one or more road construction restrictions, parking facility or parking lot restrictions, emergency parking or handicap/special need restrictions, parking costs (e.g., metered parking per hour), and distance to or from a travel destination (e.g., no parking spaces wanted over a certain distance to or from a target destination).

In one aspect, once a parking vacancy (e.g., an unoccupied parking area) is discovered and reported to the vehicular collaboration system network, one or more drivers who are actively seeking a parking space may report their intent to pursue one or more particular parking spots. The vehicular collaboration system may determine or calculate an estimated time of arrival ("ETA") for each car/driver and ranks the car/driver, based on the interested driver's current location and their target destination. This information may then be plotted in real time against the other interested drivers' locations, who have also expressed an interest in one or more of the particular parking slots. In this way, only a few drivers will actually be vying for the reported open parking spot in the target destination vicinity. Updates in real time may also be provided to each car/driver so as to alert the interested drivers if/when the one or more of the particular parking slots become occupied prior to the car/driver's arrival. Each state change of the one or more of the particular parking slots may also be tracked and monitored (e.g., a particular parking slot changing from occupied to unoccupied or unoccupied to occupied). Each state change may also be reflected in real time to the availability map. For example, if an unoccupied parking slot is being broadcast or plotted on the availability map and then becomes occupied, the availability map may be refreshed in real-time to remove the now occupied parking slot from the map.

A recalculated parking availability map would then be sent to drivers that previously registered to find a new open spot near their planned destination. If no parking space is reported as open, the original defined search radius may be automatically expanded (via a pre-determined user input) allowing a wider search grid. In one aspect, recalculated parking availability may include one or more exclusion zones from being posted on the availability map. For example, the recalculated parking availability may include one or more exclusion zones from being posted on the availability map and may include weather related restriction areas such as, for example, areas indicated for snow days when ½ of the street does not allow parking so that snow removal can be done, or scheduled celebrations, holidays, parades that isolate one or more parking areas such as city or public parking areas.

As an additional embodiment, the vehicular collaboration system network may also receive one or more manual updates from one or more users or vehicles such as, for example, via text entry and/or by Bluetooth voice commands, about a recently vacated parking spot. For example, an operation of a vehicle may send a text message or audible command via an IoT device (e.g., a voice command over a smart phone) stating their intent to leave and exit a parking stall or may report a parking stall as being empty (e.g., "I am now getting in my car and leaving the parking lot at the grocery store" or "I see that a parking stall is now available on the street near the sports arena"). These updates not only include the location of the now open parking spot, but may also include the shape and size of the vehicle leaving the parking spot. This information may be automatically uploaded into a new recalculated parking availability map that is then sent to any driver/collaborative vehicle that has expressed an interest in parking at/or near this location. Vehicular collaboration system network members searching in the targeted vicinity may be alerted to the available parking location and also receive an estimation of the shape and size of the available parking spot. The drivers/collaborative vehicles may be alerted if their vehicles are within the shape and size parameters of the parking spot and/or if their vehicle is outside of the shape and size parameters of an available parking spot, which may be designed for a sub-compact vehicle such as, for example, when their vehicle may be a large truck, van, or sport utility vehicle ("SUV").

Figure 4:
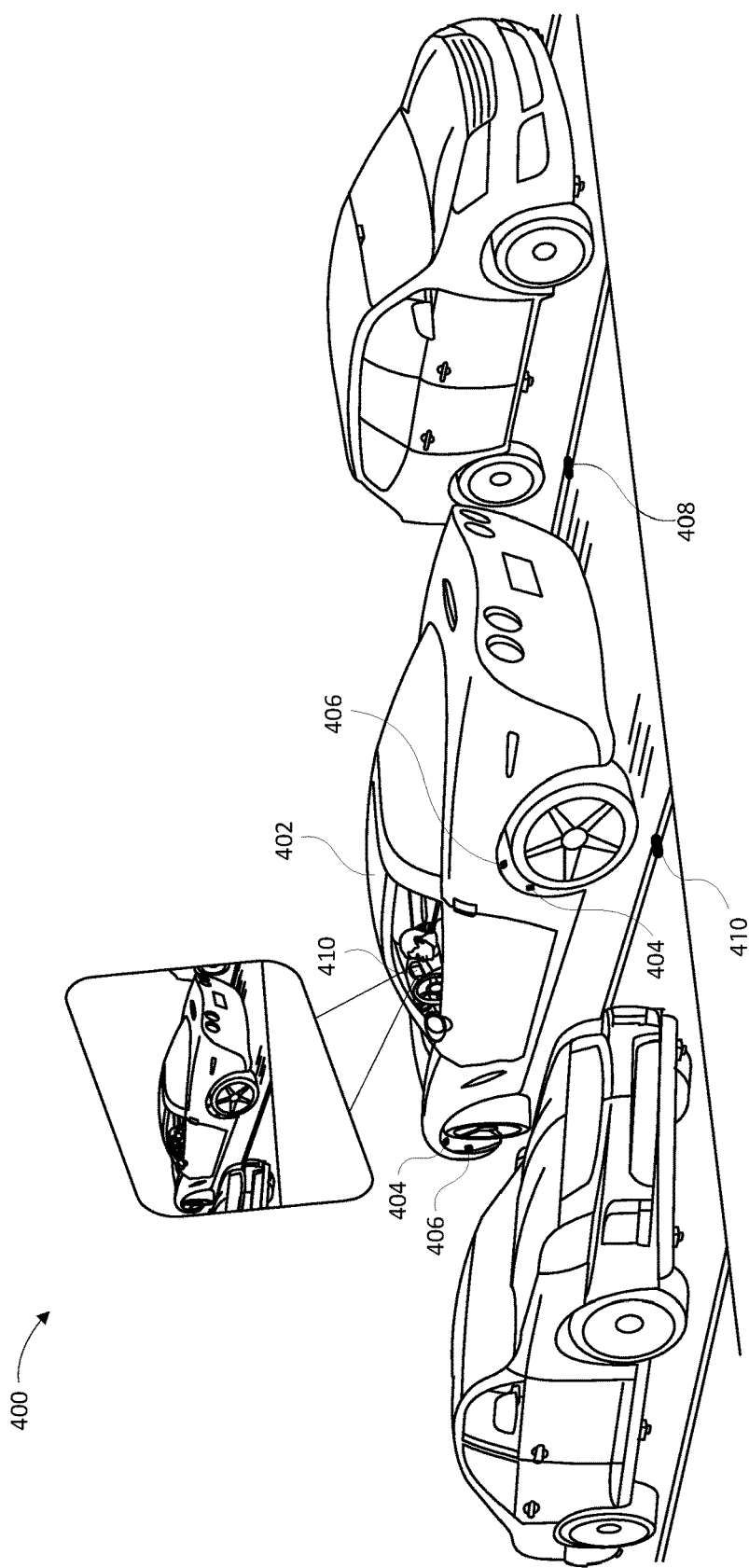
FIG. 4 is an additional diagram depicting vehicular collaboration for vehicular parking area availability using various hardware and computing components functioning in accordance with aspects of the present invention.

Turning to FIG. 4, a block diagram of various hardware 400 including a vehicle 402 equipped with various functionality as will be further described is shown in which aspects of the mechanisms of the illustrated embodiments may be realized. Vehicle 402 may be driven by an occupant and/or by using self-driving technology (e.g., autopilot). A variety of IoT devices, such as cameras 404 (including UV/thermal cameras and the like) and sensor devices 406 (e.g., audio input devices, recording devices, temperature sensors, atmospheric sensors, biological sensors, or other sensor devices to record or broadcast a wide variety of data) may be installed in or around the vehicle 402. It should be noted that vehicle 402 may be one of an automobile, off-road vehicle, bicycle, motorcycle, train, subway, ship, boat, aircraft, watercraft, sail craft, hovercraft, golf cart, and/or other type of transportation or movable object.

In one embodiment, the various cameras 404 and sensors 406 associated with the vehicle 402 may be monitored over time (e.g., in real time over a period of time). Certain data may be obtained from the respective cameras and sensor devices, such as one or more areas (e.g., parking areas) that may be visible and/or be non-visible to an occupant (e.g., driver) of the vehicle 402. In this manner, the cameras 404 and sensors 406 may capture one or more geographical areas (e.g., a parking lot area with one or more parking stalls/spots, a curb area of a parking lane, and the like) within view of the various cameras 404 and sensors 406 and display the field of view and notification/alerts on a display system 410, such as a vehicle's display device located inside the vehicle that is viewable to an occupant of the vehicle. For example, a parking stall located in front, rear, or side of the vehicle may be detected and displayed in the display system 410. The vehicle 402 may use one or more IoT devices, such as the various cameras 404 and sensors 406 to broadcast (e.g., in real-time or on-demand) a video and/or photographic image of a targeting parking area (e.g., a parking stall or curb area of a parking lane), a video of the targeting parking area, and/or any audible tone, sound, or speech relating to the availability of the targeting parking area. For example, a video of the targeting parking area and a voice of the driver indicating the parking stall is "available" or unoccupied may be broadcast to one or more collaborative vehicles in a vehicular collaboration system network. The broadcast may alert one or more drivers/collaborative vehicles desiring to park in the targeting parking area of the parking area's availability.

It should be noted that one or more cameras and/or sensors such as cameras and/or sensors 408, 410 (e.g., proximity, pressure, etc.) may also be installed on, in, or about a roadway system, pavement, curbs, parking meters, railways, airports, buildings, traffic signs or lights, intersections, areas adjacent to and/or underneath where a vehicle parks, and/or other areas capable of capturing a field of view (FOV) and/or capturing an object or signal. For example, cameras and/or sensors 408, 410 may be a camera array capturing a parking area and/or a sensor array embedded in the pavement (or curb, parking meter, etc.) as part of a vehicular collaboration system network of information.

Figure 5:
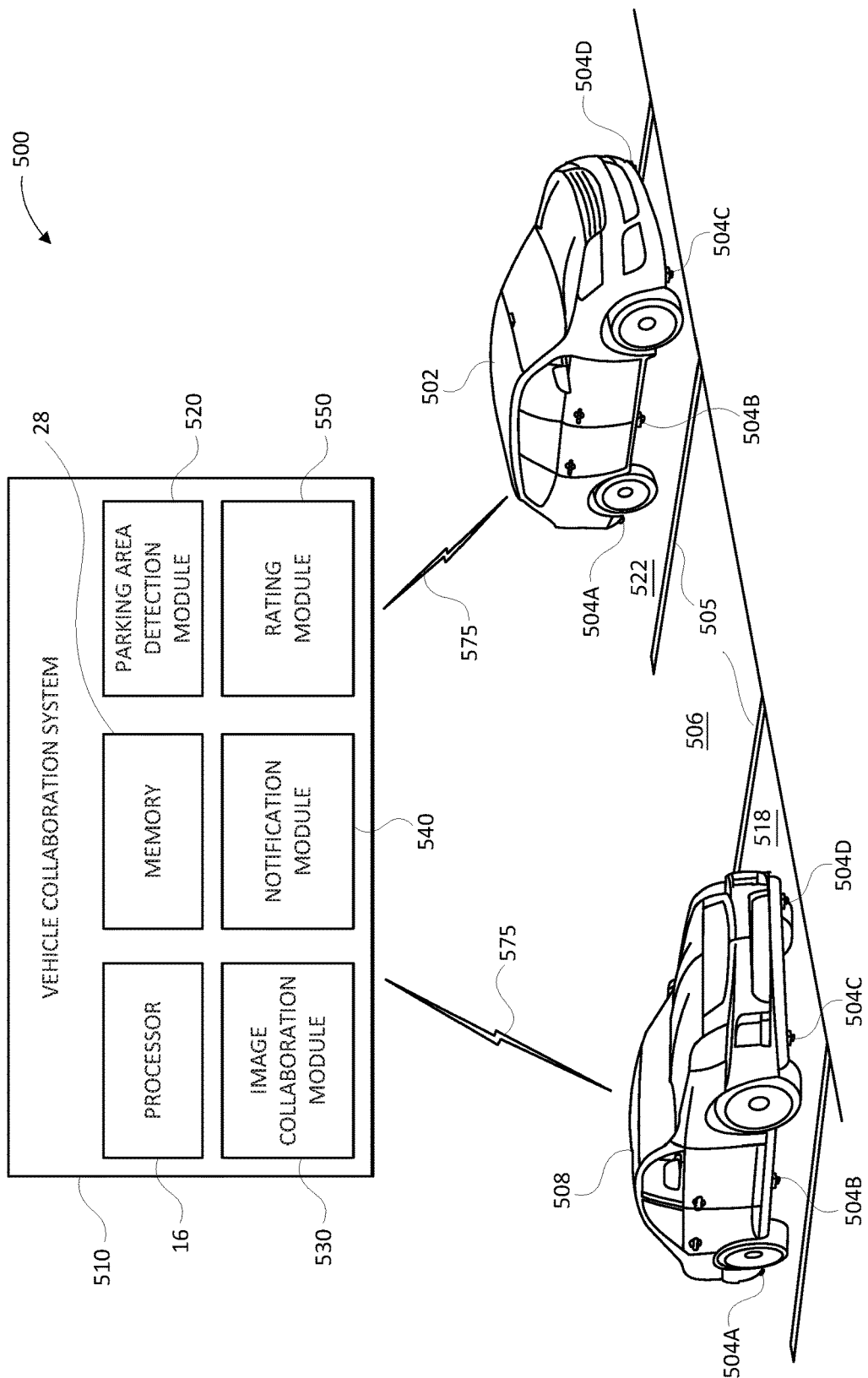
FIG. 5 is a block diagram of exemplary hardware structures when used in combination with the processing components for vehicular collaboration for vehicular parking area availability of the present invention, effecting various mechanisms of the illustrated embodiments.

Turning to FIG. 5, a block diagram of various hardware 500 equipped with various functionality as will be further described is shown in which aspects of the mechanisms of the illustrated embodiments may be realized. In one aspect, one or more of the components, modules, services, applications, and/or functions described in FIGS. 1-4 may be used in FIG. 5.

For example, computer system/server 12 of FIG. 1 may be included in FIG. 5 and may be connected to other computing nodes (such as computer systems of vehicles) over a distributed computing network, where additional data collection, processing, analytics, and other functionality may be realized. The computer system/server 12 of FIG. 1, may include a vehicle collaboration system 510, along with other related components in order to analyze and detect geographical areas (e.g., a parking lot area with one or more parking stalls/spots, a curb area of a parking lane, and the like) collected from the cameras or from the one or more sensors of one or more collaborative vehicles in a vehicular collaboration system network, such as collaborative vehicles 502, 508 that may be parked in occupied parking stalls 518 and 522.

In one embodiment, the vehicular collaboration system 510 may be in communication via network or communication link 575 with one or more vehicles such as, for example, vehicle 502 and 508. In one aspect, the vehicular collaboration system 510 may be an independent computing service provided by one or more computing systems and servers (not show (e.g., a "HUB") for illustrative convenience but may be included in one or more components, modules, services, applications, and/or functions of FIGS. 1-4) and external to the vehicles 502 and 508. In an additional embodiment, the vehicular collaboration system 510 may be located and installed within one or more vehicles such as, for example, vehicles 502 and 508. Vehicles 502 and 508 may be associated with the vehicle collaboration system 510 via one or more pre-authorization operations and/or may be instantaneously joined to the vehicular collaboration system 510 via a series of authentication operations to join and grant permission to the vehicular collaboration system 510 to gain access to one or more IoT devices and/or computing systems of vehicles 502 and 508 for sharing the collaborative data.

It should be noted that vehicles included in the vehicular collaboration system 510 may be one of an automobile, off-road vehicle, bicycle, motorcycle, train, subway, ship, boat, aircraft, watercraft, sail craft, hovercraft, golf cart, and/or other type of transportation or movable object.

More specifically, the vehicular collaboration system 510 may incorporate processing unit 16 ("processor") and memory 28 of FIG. 1, for example, to perform various computational, data processing and other functionality in accordance with various aspects of the present invention. The vehicular collaboration system 510 may also include a parking area detection module 520, image collaboration module 530, notification (alert) module 540, and rating module 550, each of which may be controlled and in communication with processing unit 16 and memory 28.

Each vehicle 502 and 508 may have installed thereon one or more internet of things (IoT) devices, such as cameras and sensor based devices 504a-d to gather data surrounding the vehicle or nearby vehicles, such as images (e.g., images of one or more vehicles), lane markings (e.g., parking lane markings, motions, sounds, and/or other environmental data). Each of the IoT devices may capture one or more geographical areas (e.g., a parking lot area with one or more parking stalls/spots, one or more vehicles in a parking area (and/or the absence of a vehicle in parking area), a curb area of a parking lane, parking lane markings, curb markings, and the like) from the devices 504a-d mounted to each of the vehicles 502 and 508. Each of the captured images may be included in a collaboration of images.

In general, the vehicle collaboration system 510 may receive a collaboration of images, videos, data, sounds, biological data, signals, and/or a combination thereof capturing one or more parking areas from one or more IoT devices 504a-d located on each one of a plurality of collaborative vehicles, such as vehicles 502 and/or 508 (e.g., a camera or sensor), in substantially close proximity to vehicles 502 and 508, for aiding in determining one or more occupied or unoccupied parking areas of a target destination.

For example, the processing component 16 may determine, from captured data from the one or more IoT devices 504a-d of both vehicles 502 and 508, an unoccupied parking area located between each of the vehicles 502 and 508. In addition, the processing component 16 may send one or more signals to other computing or control components of the vehicle collaboration system 510 to trigger a notification via notification module 540 of the detected unoccupied parking area located between vehicles 502 and 508. One of ordinary skill in the art will appreciate that additional factors, such as the parking area's geographical position, shape, size, and/or other defined parking factors or parameters may be observed and/or determined from vehicles 502 and 508 (or other collaborative vehicles not depicted for illustrative convenience) available through a distributed computing environment that may be used to assist with receiving a collaboration of images, videos, or other sensor data from one or more IoT devices 504a-d upon capturing the one or more parking areas.

The plurality of factors or parking thresholds may include, but are not limited to, a user profile (e.g., user likes/dislikes relating to parking areas, historical data relating to driving patterns and/or parking patterns and preferences, travel patterns, favorite target destinations, frequently visited parking areas, data relating types of vehicles the user may drive or own and/or shapes, sizes, makes, models, or dimensions of the types of vehicles the user may drive), lane markings (including the size, shape, dimensions, length, width of the lane markings, presence or absence of lane marking, etc.), restricted parking times, required parking times of an operator of a vehicle, restricted travel times of each operator or one or more collaborative vehicles, restrictions based on how long parking is allowed (e.g., a maximum of 1 hour as compared to a need for 6 hours of parking), one or more road construction restrictions, parking facility or parking lot restrictions, emergency parking or handicap/special need restrictions, parking costs (e.g., metered parking per hour), and distance to or from a travel destination (e.g., no parking spaces wanted over a certain distance to or from a target destination).

The various cameras and sensors, such as devices 504a-d, associated with the vehicle 502 or 508 may monitor the vehicle 502 or 508 over a selected time period (e.g., in real time) upon activation of the vehicle collaboration system 510. Certain data may be obtained from the respective cameras and sensor devices 504a-d, such as one or more parking areas, which may be the detected unoccupied parking area 506 located between vehicles 502 and 508 or more specifically, the detected unoccupied parking area 506 located between parking lanes 505. In this manner, the camera and sensors 504a-d may capture one or more parking areas which may include lane markings (e.g., the lane markings 505), signage, or other image detectable means by the camera and/or sensors 504a-d.

The image collaboration module 530 may request access to the collaborative vehicles, such as vehicle 502 or 508, in substantially close proximity to one of the vehicles, such as vehicle 502 or 508, for receiving an image from each imaging or sensing device associated with the vehicles 502 and 508, wherein each received image is included in the collaboration of images. Upon receiving permission to access the cameras and sensor based devices 504*a-d* of each of the vehicles 502 and 508 in the vehicle collaboration system 510, the image collaboration module 530 may collect, gather, and process the data received from each of the respective cameras and sensor devices 504*a-d* from vehicles 502 and/or 508.

The parking area detection module 520 may use the processed data from the image collaboration module 530 to detect a parking area (and one or more parking lanes 505) and determine whether the parking area is unavailable (e.g., occupied) for parking and/or available (e.g., unoccupied) for parking, such as parking area 506, which may include one or more parking lanes, such as parking lanes 505. More specifically, the parking area detection module 520 may detect one or more parking lanes, such as parking lanes 505, vehicles, objects, emergency marking, signs, or articles in the one or more parking areas 506 using the collaboration of images (e.g., collaboration of data) received from one or more of the devices 504*a-d*.

The notification module 540 may be signaled to provide an alert or an alarm, which may indicate to the collaborative vehicles, such as vehicle 502 or 508, the parking area(s), such as parking area 506, is available or unavailable. The notification module 540 may provide a notification to the vehicle upon detecting the parking area 506. The notification module 540 may broadcast an audible alert via a speaker device associated with one or more collaborative vehicles, such as vehicle 502 or 508. The notification module 540 may also provide an alternative parking area (not shown for illustrative convenience) to enable the vehicle to circumvent the parking area 506 and park in an alternative parking area.

For example, in one aspect, the warning or alert may be displayed within one or more graphical user interfaces (GUI), displays systems, and/or navigational systems of the vehicle. Alternatively, the notification module 540 may signal a device such as, devices 504*a-d*, which may be a microphone, to broadcast an alert, sound, alarm, or audible command to a driver of one or more of the collaborative vehicles, such as vehicle 502 and/or 508.

The rating module 550 may also assist in preventing an anticipated movement of the vehicle upon detecting the parking area 506 in the one or more non-visible areas. For example, the rating module 550 may signal one or more computing systems, such as a computing or control system of a vehicle responsible for breaking or stopping, to cause a braking force to the vehicle to terminate a forward motion or a rearward motion of the vehicle upon detecting the object in the one or more non-visible areas. In one aspect, the rating module 550 itself may signal one or more mechanical systems of the vehicle to cause the braking force to stop the vehicle or prevent movement of the vehicle. Moreover, the rating module 550 may also signal or direct additional control systems of the vehicle, such as vehicle 502 or 508, to terminate the operation of an engine or transmission, cease power to the transmission, and/or temporarily disengage the transmission from forward or rearward operation to a neutral or park position.

Figure 6:
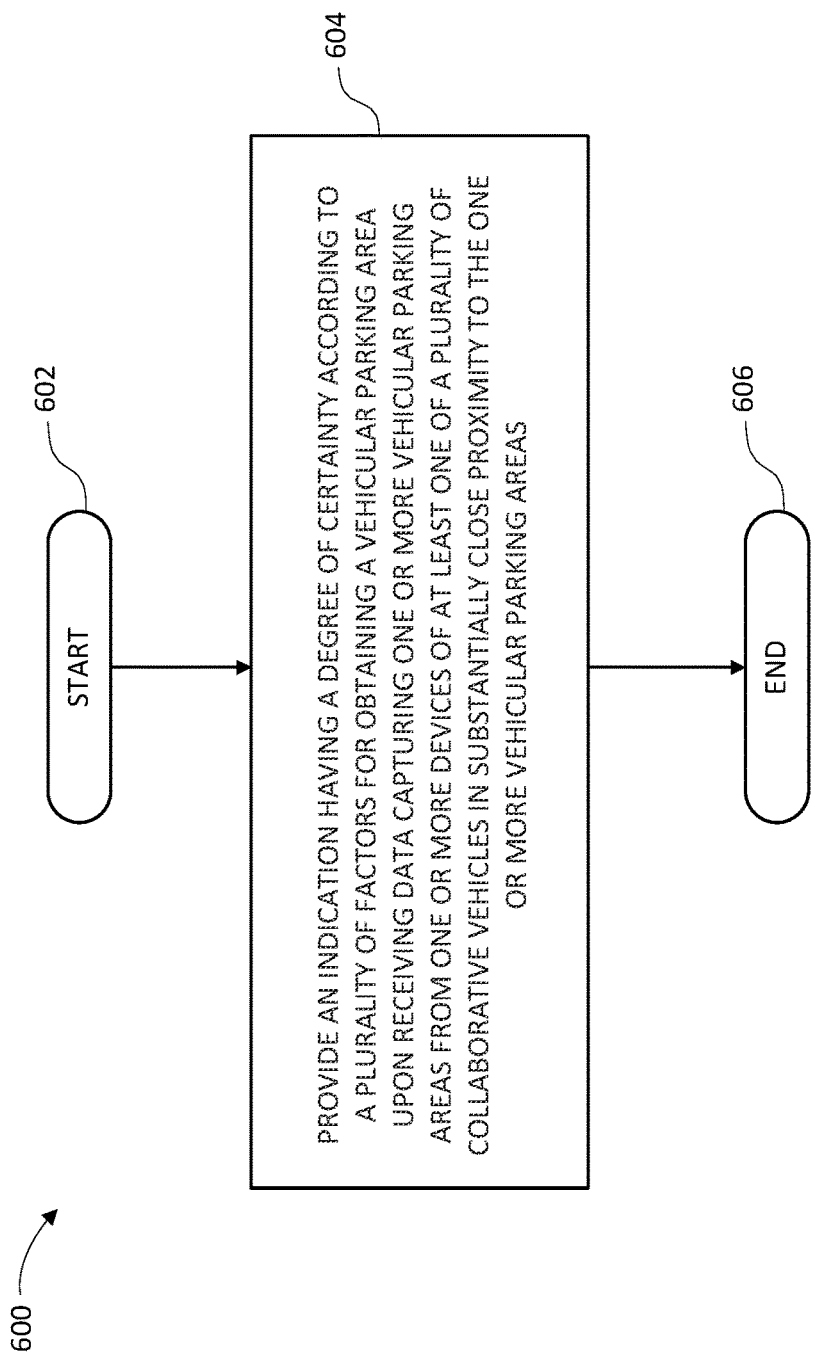
FIG. 6 is a flowchart diagram of an exemplary method for using vehicular collaboration for vehicular parking area availability detection by a processor, in which various aspects of the present invention may be realized.

Turning now to FIG. 6, a method 600 for using vehicular collaboration for vehicular parking area availability detection by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602. An indication, having a degree of certainty), according to a plurality of factors for obtaining a vehicular parking area, may be provided (via a graphical user interface "GUI" of a computing system of a vehicle) upon receiving data capturing one or more vehicular parking areas from one or more devices of at least one of a plurality of collaborative vehicles in substantially close proximity to the one or more vehicular parking areas, as in block 604. The functionality 600 may end, as in block 606.

Figure 7:
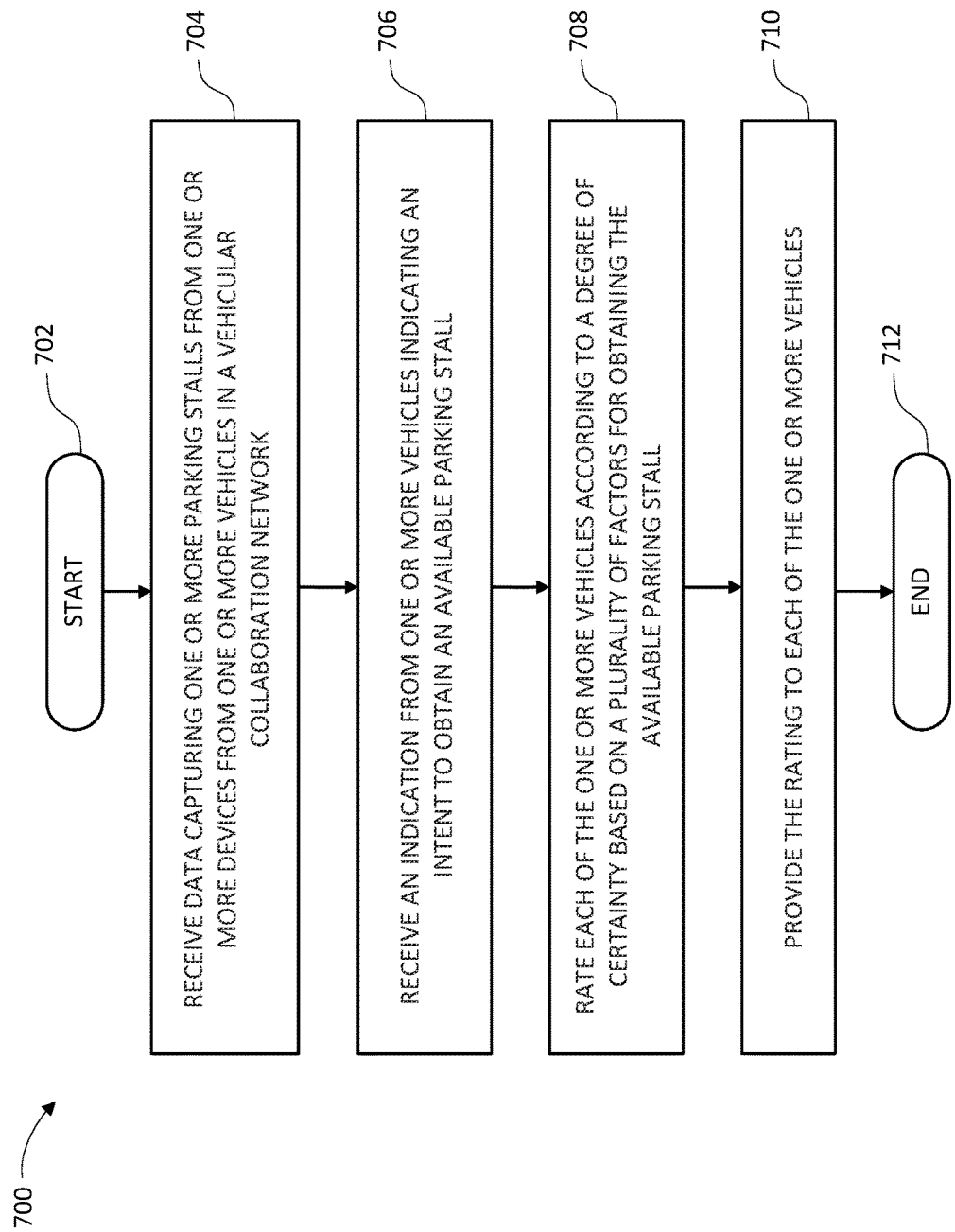
FIG. 7 is a flowchart diagram of an additional exemplary method for using vehicular collaboration for vehicular parking area availability detection by a processor, in which various aspects of the present invention may be realized.

Turning now to FIG. 7, a method 700 for using vehicular collaboration for vehicular parking area availability detection by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. One or more parking stalls may be captured from one or more devices from one or more vehicles in a vehicular collaboration network (e.g., captured data of parking stalls forming vehicular collaboration information), as in block 704. That is, a camera and/or sensor based device, installed on one or more vehicles in the vehicular collaboration system associated with the vehicle may be activated to capture one or more parking stalls. In one aspect, the camera and/or sensor based devices of the vehicle and/or vehicular collaboration information received from one or more vehicles associated with a vehicular collaboration system may be gathered and analyzed to both detect and determine a size, width, and availability of the parking stalls.

An indication may be received from one or more vehicles indicating an intent to obtain an available parking stall, as in block 706. The indication, which may include a target destination and a preference for a size, location, distance from a target location, driver preference (e.g., whether or not the driver desires to park next to other vehicles, preference for parking in a handicap parking stall based on a driver's physical condition, preference for parking in a favorite parking stall, and the like), and/or other defined or selected factors, may be provided using a direction control means of the vehicle. Each of the one or more vehicles (e.g., providing an indication of intent for obtaining a parking stall) may be rated according to a degree of certainty based on a plurality of factors for obtaining the available parking stall, as in block 708. In other words, a degree of certainty may be a percentage representing what the chances are for the driver of each vehicle to obtain an open, available, parking stall. For example, the vehicular collaboration network may analyze the plurality of factors and calculate a percentage such as, for example, 85% for obtaining an open, available, parking stall in one or more preferred locations of a target destination. The ratings may be provided to each of the one or more vehicles, as in block 710. In one aspect, using one or more computing systems of the vehicle, such as a navigation system and/or self-driving ("autopilot") system, the vehicle may be enabled, using the information about the open, available, parking stalls, to navigate, move, and position the vehicle to the open, available, parking stalls. The functionality 700 may end, as in block 712.

In one aspect, in conjunction with and/or as part of at least one block of FIGS. 6-7, the operations of methods 600 and/or 700 may include each of the following. The operations of methods 600 and/or 700 may determine the degree of certainty according to the plurality of factors for limiting a number of candidates for obtaining the vehicular parking area, wherein the plurality of factors include defined travel times of a user, a length of allowable parking time of the vehicular parking area, parking costs of the vehicular parking area, a distance from a travel origin to the vehicular parking area, a size of the vehicular parking area, a size of a vehicle, average length of time the one or more vehicular parking areas are occupied, or a combination thereof. The one or more vehicular parking areas may be captured from one or more camera or sensor based devices mounted to the at least one of the plurality of collaborative vehicles.

The operations of methods 600 and/or 700 may detect an availability of the vehicular parking area in the one or more vehicular parking areas using a collaboration of images or video stream, detect an unavailability of the vehicular parking area in the one or more vehicular parking areas using the collaboration of images or video stream, and/or provide an alert in the indication such that the alert provides the availability of the vehicular parking area or the unavailability of the vehicular parking area.

An estimated time of arrival (ETA) may be calculated and/or determined based on a current location of a vehicle and distance from the current location to the vehicular parking area, and each one of the plurality of collaborative vehicles in a collaborative vehicle network may be ranked according the calculated ETA. The operations of methods 600 and/or 700 may provide, in a GUI of a computing system of a vehicle, a map containing availability of the one or more vehicular parking areas within a defined geographical region. One or more alternative vehicular parking areas may also be determined within an expanded area of the defined geographical region. The operations of methods 600 and/or 700 may also display, in real time in the GUI, each state change (e.g. occupied to unoccupied or unoccupied to occupied) of the vehicular parking area.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for using vehicular collaboration for vehicular parking area availability detection, comprising:
providing an indication, including displaying a probability, that a vehicle parking area is available for use, the probability determined according to a plurality of factors for obtaining the vehicular parking area upon receiving data capturing one or more vehicular parking areas from one or more devices of at least one of a plurality of collaborative vehicles in substantially close proximity to the one or more vehicular parking areas; wherein the capturing includes capturing the one or more vehicular parking areas from one or more camera or sensor based devices mounted to the at least one of the plurality of collaborative vehicles.

2. The method of claim 1, further including determining the probability according to the plurality of factors for limiting a number of candidates for obtaining the vehicular parking area, wherein the plurality of factors include defined travel times of a user, a length of allowable parking time of the vehicular parking area, parking costs of the vehicular parking area, a distance from a travel origin to the vehicular parking area, a size of the vehicular parking area, a size of a vehicle, average length of time the one or more vehicular parking areas are occupied, or a combination thereof.

3. The method of claim 1, further including:
detecting an availability of the vehicular parking area in the one or more vehicular parking areas using a collaboration of images or video stream;
detecting an unavailability of the vehicular parking area in the one or more vehicular parking areas using the collaboration of images or video stream; or
providing an alert in the indication such that the alert provides the availability of the vehicular parking area or the unavailability of the vehicular parking area.

4. The method of claim 1, further including:
calculating an estimated time of arrival (ETA) based on a current location of a vehicle and distance from the current location to the vehicular parking area; and
ranking each one of the plurality of collaborative vehicles in a collaborative vehicle network according to the calculated ETA.

5. The method of claim 1, further including:
providing in a graphical user interface (GUI) a map containing availability of the one or more vehicular parking areas within a defined geographical region; and
determining one or more alternative vehicular parking areas within an expanded area of the defined geographical region.

6. The method of claim 1, further including displaying in real time in a graphical user interface (GUI) each state change of the vehicular parking area.

7. A system for using vehicular collaboration for vehicular parking area availability detection, comprising:
a processor, operable to receive input from a vehicular collaboration environment, that:
provides an indication, including displaying a probability, that a vehicle parking area is available for use, the probability determined according to a plurality of factors for obtaining the vehicular parking area upon receiving data capturing one or more vehicular parking areas from one or more devices of at least one of a plurality of collaborative vehicles in substantially close proximity to the one or more vehicular parking areas; wherein the capturing includes capturing the one or more vehicular parking areas from one or more camera or sensor based devices mounted to the at least one of the plurality of collaborative vehicles.

8. The system of claim 7, wherein the processor determines the probability according to the plurality of factors for limiting a number of candidates for obtaining the vehicular parking area, wherein the plurality of factors include defined travel times of a user, a length of allowable parking time of the vehicular parking area, parking costs of the vehicular parking area, a distance from a travel origin to the vehicular parking area, a size of the vehicular parking area, a size of a vehicle, average length of time the one or more vehicular parking areas are occupied, or a combination thereof.

9. The system of claim 7, wherein the processor:
detects an availability of the vehicular parking area in the one or more vehicular parking areas using a collaboration of images or video stream;
detects an unavailability of the vehicular parking area in the one or more vehicular parking areas using the collaboration of images or video stream; or
provides an alert in the indication such that the alert provides the availability of the vehicular parking area or the unavailability of the vehicular parking area.

10. The system of claim 7, wherein the processor:
calculates an estimated time of arrival (ETA) based on a current location of a vehicle and distance from the current location to the vehicular parking area; and
ranks each one of the plurality of collaborative vehicles in a collaborative vehicle network according to the calculated ETA.

11. The system of claim 7, wherein the processor:
provides in a graphical user interface (GUI) a map containing availability of the one or more vehicular parking areas within a defined geographical region; and
determines one or more alternative vehicular parking areas within an expanded area of the defined geographical region.

12. The system of claim 7, wherein the processor displays in real time in a graphical user interface (GUI) each state change of the vehicular parking area.

13. A computer program product for using vehicular collaboration for vehicular parking area availability detection by a processor, the computer program product comprising a non-transitory computer-readable storage medium having computer-readable program code portions stored therein, the computer-readable program code portions comprising:

an executable portion that provides an indication, including displaying a probability, that a vehicle parking area is available for use, the probability determined according to a plurality of factors for obtaining the vehicular parking area upon receiving data capturing one or more vehicular parking areas from one or more devices of at least one of a plurality of collaborative vehicles in substantially close proximity to the one or more vehicular parking areas; wherein the capturing includes capturing the one or more vehicular parking areas from one or more camera or sensor based devices mounted to the at least one of the plurality of collaborative vehicles.

14. The computer program product of claim 13, further including an executable portion that determines the probability according to the plurality of factors for limiting a number of candidates for obtaining the vehicular parking area, wherein the plurality of factors include defined travel times of a user, a length of allowable parking time of the vehicular parking area, parking costs of the vehicular parking area, a distance from a travel origin to the vehicular parking area, a size of the vehicular parking area, a size of a vehicle, average length of time the one or more vehicular parking areas are occupied, or a combination thereof.

15. The computer program product of claim 13, further including an executable portion that:

detects an availability of the vehicular parking area in the one or more vehicular parking areas using a collaboration of images or video stream;

detects an unavailability of the vehicular parking area in the one or more vehicular parking areas using the collaboration of images or video stream; or provides an alert in the indication such that the alert provides the availability of the vehicular parking area or the unavailability of the vehicular parking area.

16. The computer program product of claim 13, further including an executable portion that:

calculates an estimated time of arrival (ETA) based on a current location of a vehicle and distance from the current location to the vehicular parking area; and ranks each one of the plurality of collaborative vehicles in a collaborative vehicle network according to the calculated ETA.

17. The computer program product of claim 13, further including an executable portion that:

provides in a graphical user interface (GUI) a map containing availability of the one or more vehicular parking areas within a defined geographical region; and determines one or more alternative vehicular parking areas within an expanded area of the defined geographical region.

18. The computer program product of claim 13, further including an executable portion that displays in real time in a graphical user interface (GUI) each state change of the vehicular parking area.

* * * * *